April 9, 1940.  J. H. JOHANSON  2,196,923
RESILIENT PULLEY
Filed Oct. 3, 1938

INVENTOR
JOHN H. JOHANSON
BY
ATTORNEY

Patented Apr. 9, 1940

2,196,923

UNITED STATES PATENT OFFICE 2,196,923

RESILIENT PULLEY

John H. Johanson, Cleveland, Ohio, assignor to The Cleveland Heater Company, Cleveland, Ohio, a corporation of Ohio Application October 3, 1938, Serial No. 232,973

5 Claims. (Cl. 74—230.1)

This invention relates to pulleys or like machine elements and refers more particularly to improvements in V-type pulleys having certain resilience in their belt engaging surfaces.

An object of the invention is to provide a simple, efficient V-type resilient pulley which is composed of few parts and relatively inexpensive to manufacture.

In its simplest form the present novel pulley comprises a mounting hub and yieldable side members forming the V-shaped belt engaging pulley groove, together with resilient connecting means for securing the side members to the hub.

To the accomplishment of the foregoing and related ends, said invention, then, consists of the means hereinafter fully described and particularly pointed out in the claims; the annexed drawing and the following description setting forth in detail certain mechanism embodying the invention, such disclosed means constituting, however, but one of the various mechanical forms in which the principle of the invention may be used.

Figure 1:
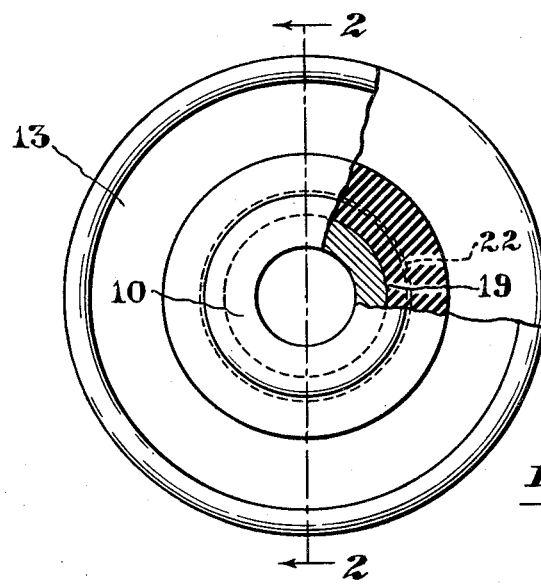
Figure 2:
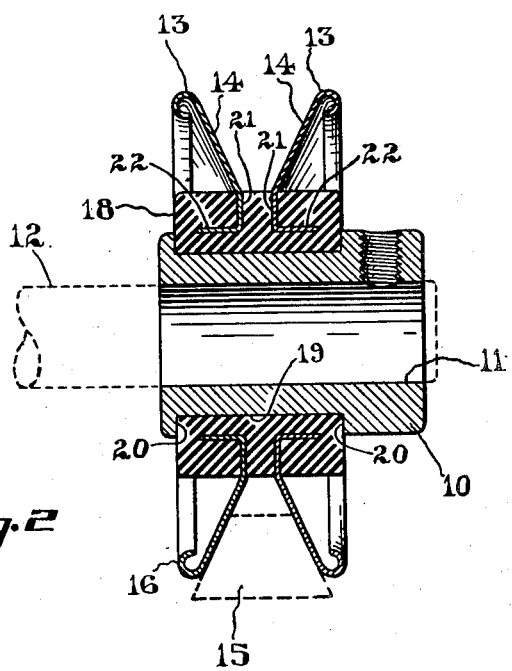

In said annexed drawing:

Fig. 1 is a side elongated view, partially broken away, of the novel pulley hereof, and Fig. 2 is a cross-sectional view taken on line 2—2 of Fig. 1.

In the illustrated embodiment of the invention in said drawing the center or hub portion 10 has a bearing hole 11 therethrough by means of which the pulley may be suitably mounted upon a shaft or other rotating element indicated at 12.

The exterior of hub 10 is provided with means for carrying a pair of side members 13, which latter have opposed inclined surfaces 14 constituting the driving or friction surfaces conventional to the present type device. At 15 there is indicated in dotted lines a regular V-belt engaged in the V-shaped driving recess of the pulley.

In accord with the principle of the invention, the side members are made of sheet metal sufficiently light in gauge to afford a certain resiliency in their engagement with a belt 15. By this construction it has been found that the driving engagement between the improved pulley and belt is considerably improved over the usual rigid pulley, and also that such novel construction tends to absorb the shock of sudden strains or accelerations of the pulley or belt.

As seen best in Fig. 2, the outer circumferential edge of each member 13 is rolled upon itself to provide a smooth curved contour as at 16, which as will readily be apparent eliminates any chance of the pulley sides digging into the belt should the latter for any reason ride directly upon these edges. The rolled edges 16 also tend to strengthen the sides 13 and permit the use of relatively light gauge material.

The hub 10, as mentioned above, is provided with exterior means for securing the side members in place. Preferably this means comprises a ring-like element 18 of rubber firmly seated in an annular recess 19 of the hub between shoulders 20. The rubber ring 18 is comparatively thick and as shown in Fig. 2 the inner ends of side members 13 are anchored therein. Each member 13 has its inner peripheral edge contiguous with the inclined surface 14 formed with a radial short flange portion 21 and a right angularly bent lateral flange 22. These portions 21 and 22 are received and secured in corresponding relieved portions of the ring 18. As in the case of edge 13, the flange 22 adds strength to the side member structure. In addition this flange 22 acts to prevent separation of the side member from its rubber mounting and at the same time permit the full play of resiliency in the working of the said member under the frictional strain of belt 15.

The assembly just described may be formed in any desired manner, one very efficient one being to vulcanize the rubber ring 18 in place in recess 19 and about flanges 21 and 22. A pulley so made will be found very durable in use.

From the foregoing it will be seen that the present invention provides a novel pulley which has material advantages over all other known pulleys of like type. The improved pulley has been proven to afford an efficient means for coupling a V-belt to a rotating shaft, and one which is not only quiet in operation but through its resilient construction in the sheet metal sides and rubber mounting to reduce the wear upon the V-belt.

It has also been found that the present novel pulley is quite effective in eliminating various noises encountered in V-belt driving mechanism, for example such noises as the friction between the belt and the pulley surfaces and the hum of the motor carrying the pulley. A particular use of V-belts and the instant type pulley is in air conditioning apparatus wherein it is quite essential that as much of the noise as is possible be eliminated.

It will also be apparent from an understanding of the details of the invention described above that the side members 13 may be made in one piece rather than in the two separate pieces as shown. With such construction the intermediate connecting portion of an integral sheet metal side member will be embedded in the rubber or resilient ring 18, and other anchorage elements somewhat of the shape of right angular flanges 22 may be struck laterally from the side member material in any of the well known manners of providing tabs and like elements in sheet metal work.

I claim:

1. A pulley of the character described comprising a hub, resilient material on the outside of said hub, and side members carried solely by said material and without auxiliary attachment means in opposed relation and forming a V-shaped pulley groove about said hub.

2. A pulley of the character described comprising a hub, an annular layer of resilient material on the hub exterior, side members having their inner peripheries embedded in said resilient material and portions projecting beyond said material, said portions forming therebetween a substantially V-shaped groove.

3. A pulley of the character described comprising a hub having an annular recess in its outer surface, a relatively thick layer of resilient material secured in said recess, and sheet metal side members having their inner edges anchored in said resilient material and having opposed inclined surfaces projecting beyond said resilient material and forming therebetween a substantially V-shaped groove.

4. A pulley of the character described comprising a hub, an annular layer of resilient material on said hub exterior, a pair of side members, each member having a portion embedded in said resilient material, said embedded portions comprising a right-angularly bent terminal flange extending substantially parallel to the hub axis, and opposed inclined surfaces on said side members extending beyond said resilient material and forming therebetween a substantially V-shaped groove.

5. A pulley of the character described comprising a hub having an annular recess in its outer surface, a ring of resilient material secured in said recess and a pair of disk-shape side members carried by said resilient material, the inner peripheral portions of said disk being anchored in said resilient material and the outer peripheral portions of said disk being inclined in opposed relation to provide a substantially V-shaped groove therebetween.

JOHN H. JOHANSON.